(12) United States Patent
Mitsuda et al.

(10) Patent No.: US 9,520,736 B2
(45) Date of Patent: Dec. 13, 2016

(54) CHARGING CONTROL APPARATUS AND CHARGING CONTROL METHOD FOR SECONDARY BATTERY

(75) Inventors: Kenro Mitsuda, Tokyo (JP); Daigo Takemura, Tokyo (JP); Masaki Yamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 223 days.

(21) Appl. No.: 14/123,900

(22) PCT Filed: Jul. 23, 2012

(86) PCT No.: PCT/JP2012/068589
§ 371 (c)(1),
(2), (4) Date: Dec. 4, 2013

(87) PCT Pub. No.: WO2013/015244
PCT Pub. Date: Jan. 31, 2013

(65) Prior Publication Data
US 2014/0111145 A1  Apr. 24, 2014

(30) Foreign Application Priority Data
Jul. 27, 2011  (JP) .................. 2011-163798

(51) Int. Cl.
*H02J 7/00* (2006.01)
*B60L 11/14* (2006.01)
(Continued)

(52) U.S. Cl.
CPC .............. *H02J 7/007* (2013.01); *B60L 11/14* (2013.01); *B60L 11/1811* (2013.01);
(Continued)

(58) Field of Classification Search
CPC ....... Y02E 60/12; H02J 7/0042; H02J 7/0045; H01M 10/46; H01M 10/44; B60L 1/20; B60L 7/10–7/18
(Continued)

(56) References Cited

U.S. PATENT DOCUMENTS 5,588,498 A * 12/1996 Kitada .................... B60K 6/46
123/179.18
7,696,727 B2 * 4/2010 Choi .................... G01R 15/002
320/128
(Continued)

FOREIGN PATENT DOCUMENTS

CN       102064589 A       5/2011
JP       2007 141493       6/2007
(Continued)

OTHER PUBLICATIONS

Combined Chinese Office Action and Search Report issued Apr. 28, 2015 in Patent Application No. 201280030344.6 (with partial English language translation and English translation of categories of cited documents).
(Continued)

*Primary Examiner* — Arun Williams
(74) *Attorney, Agent, or Firm* — Oblon, McClelland, Maier & Neustadt, L.L.P.

(57) ABSTRACT

A charging control apparatus for a secondary battery, including a current control apparatus for, upon charging for a secondary battery from an electric generator regenerating kinetic energy as regenerative energy, performing control so as to suppress charging current for the secondary battery at a start of charging to a predetermined suppression rate with respect to charging current at the start of charging in the case that the charging current is not suppressed, and decrease the suppression rate as time elapses.

9 Claims, 8 Drawing Sheets

(51) Int. Cl.

| | |
|---|---|
| *B60W 10/26* | (2006.01) |
| *H01M 10/44* | (2006.01) |
| *B60L 11/18* | (2006.01) |
| *H02J 7/06* | (2006.01) |
| *H02J 7/14* | (2006.01) |
| *B60W 20/00* | (2016.01) |
| *B60W 30/18* | (2012.01) |
| *H01M 10/052* | (2010.01) |

(52) U.S. Cl.
CPC ............ *B60W 10/26* (2013.01); *B60W 20/14* (2016.01); *H01M 10/44* (2013.01); *H02J 7/06* (2013.01); *H02J 7/14* (2013.01); *B60W 20/00* (2013.01); *B60W 30/18127* (2013.01); *H01M 10/052* (2013.01); *H01M 2220/20* (2013.01); *Y02T 10/70* (2013.01); *Y02T 10/7005* (2013.01); *Y02T 10/7011* (2013.01); *Y02T 10/7022* (2013.01); *Y02T 10/7072* (2013.01); *Y02T 10/7077* (2013.01); *Y02T 90/127* (2013.01); *Y02T 90/14* (2013.01)

(58) Field of Classification Search
USPC ......................................................... 320/107
See application file for complete search history.

(56) References Cited

U.S. PATENT DOCUMENTS

| | | | | |
|---|---|---|---|---|
| 2003/0222502 | A1* | 12/2003 | Takahashi ............ | B60L 11/005 307/18 |
| 2005/0099155 | A1 | 5/2005 | Okuda et al. | |
| 2006/0244420 | A1* | 11/2006 | Stanesti ................ | H02J 7/0018 320/128 |
| 2007/0138996 | A1* | 6/2007 | Kobayashi ........ | H01M 8/04559 320/101 |
| 2007/0298315 | A1* | 12/2007 | Yamamoto .......... | H01M 10/425 429/62 |
| 2009/0021220 | A1* | 1/2009 | Choi .................... | H01M 10/46 320/137 |
| 2010/0013430 | A1* | 1/2010 | Manor ................. | H02J 7/0016 320/106 |
| 2010/0052624 | A1* | 3/2010 | Li ........................ | H02J 7/0072 320/163 |
| 2012/0022735 | A1* | 1/2012 | Tashiro ................ | B60L 7/18 701/22 |

FOREIGN PATENT DOCUMENTS

| | | |
|---|---|---|
| JP | 2011 98577 | 5/2011 |
| JP | 2011 189768 | 9/2011 |
| WO | 00 42673 | 7/2000 |
| WO | 2004 066472 | 8/2004 |

OTHER PUBLICATIONS

International Search Report Issued Oct. 30, 2012 in PCT/JP12/068589 Filed Jul. 23, 2012.

* cited by examiner

CHARGING CONTROL APPARATUS AND CHARGING CONTROL METHOD FOR SECONDARY BATTERY

TECHNICAL FIELD

The present invention relates to a charging control apparatus and a charging control method for secondary battery.

BACKGROUND ART

In some of conventional charging control apparatuses and charging control methods for a battery as a secondary battery, when brake is applied during travelling of a vehicle, the vehicle is braked by a mechanical brake and a motor generator linked with an engine is operated as an electric generator, serving as an electric brake, so that regenerative current flows in a DC/DC converter via a power conversion circuit, whereby regenerative power is stored into the battery and a capacitor. In this case, the battery charging power may be kept substantially at a constant value from the start of regeneration (for example, see Patent Document 1).

If the battery charging power is kept substantially at a constant value from the start of regeneration, the battery voltage does not vary as greatly as the capacitor voltage, and therefore it is considered that the buttery current becomes substantially constant. Such control is due to consideration of making the charging current for the battery equal to or smaller than a permissible value for the battery. Thus, while the charging current for the battery is kept substantially at a constant value from the start of regeneration, charging control is performed such that the charging current does not exceed its permissible upper limit value. This is generally called battery current constant control, which is a general charging control method.

CITATION LIST

Patent Document

Patent Document 1: International Publication WO2004/066472

SUMMARY OF THE INVENTION

Problems to be Solved by the Invention

Since the conventional charging control apparatus for battery is configured as described above, upon regeneration, the permissible maximum charging current flows into the battery from the start of regeneration. However, since the battery is an electric storage device using chemical reaction, even if abrupt charging for the battery at the permissible maximum current is attempted from the very beginning, due to diffusion limitation, the battery is not completely charged in normal reaction, and side reaction occurs to promote deterioration of the battery, so that the cycle life might be reduced. In addition, in the case where the capacitor is fully charged, generated power cannot be absorbed by the capacitor, and therefore a problem arises that the charging power for the battery cannot be reduced. If the charging power for the battery cannot be reduced, deterioration of the battery might be promoted.

The present invention has been made to solve the above problems, and an object of the present invention is to obtain a charging control apparatus for secondary battery that realizes extension of the cycle life of a secondary battery which is charged from an electric generator regenerating kinetic energy as regenerative power, and to provide such a charging control method.

Solution to the Problems

A charging control apparatus for secondary battery according to the present invention includes a current control apparatus for, upon charging for a secondary battery from an electric generator regenerating kinetic energy as regenerative energy, performing control so as to suppress charging current for the secondary battery at the start of charging to a predetermined suppression rate with respect to charging current at the start of charging in the case where the charging current is not suppressed, and decrease the suppression rate as time elapses.

In addition, a charging control method for secondary battery according to the present invention includes, upon charging for a secondary battery from an electric generator regenerating kinetic energy as regenerative energy, suppressing charging current for the secondary battery at the start of charging to a predetermined suppression rate with respect to charging current at the start of charging in the case where the charging current is not suppressed, and decreasing the suppression rate as time elapses.

Effect of the Invention

The charging control apparatus for secondary battery according to the present invention includes a current control apparatus for, upon charging for a secondary battery from an electric generator regenerating kinetic energy as regenerative energy, performing control so as to suppress charging current for the secondary battery at the start of charging to a predetermined suppression rate with respect to charging current at the start of charging in the case where the charging current is not suppressed, and decrease the suppression rate as time elapses. Therefore, the charging control apparatus for secondary battery according to the present invention realizes extension of the cycle life of the secondary battery.

In addition, the charging control method for secondary battery according to the present invention includes, upon charging for a secondary battery from an electric generator regenerating kinetic energy as regenerative energy, suppressing charging current for the secondary battery at the start of charging to a predetermined suppression rate with respect to charging current at the start of charging in the case where the charging current is not suppressed, and decreasing the suppression rate as time elapses. Therefore, the charging control method for secondary battery according to the present invention realizes extension of the cycle life of the secondary battery.

DESCRIPTION OF EMBODIMENTS

Embodiment 1

Figure 1:
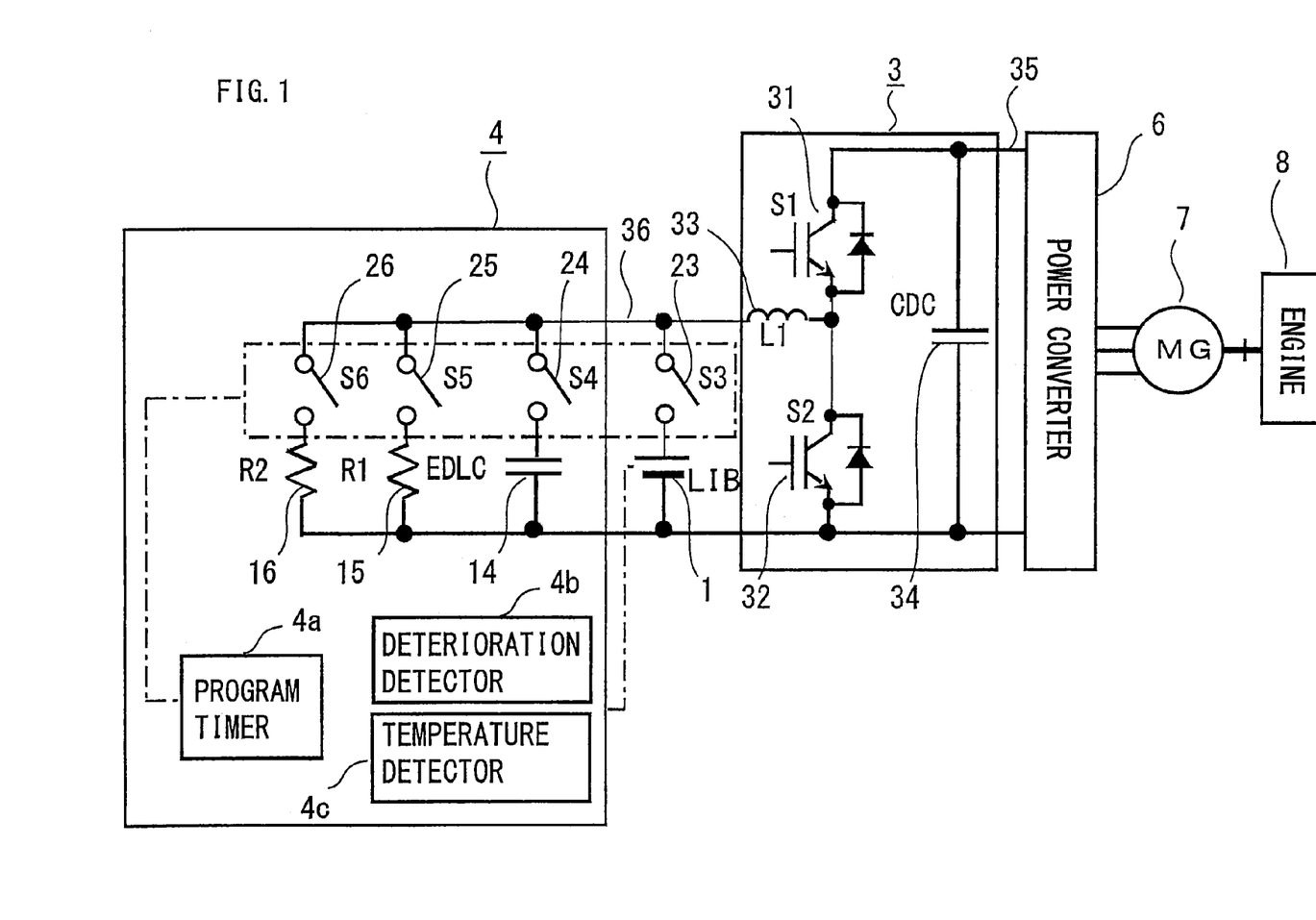
FIG. 1 is a circuit diagram showing the configuration of a charging control apparatus for battery according to embodiment 1 of the present invention.
Figure 2:
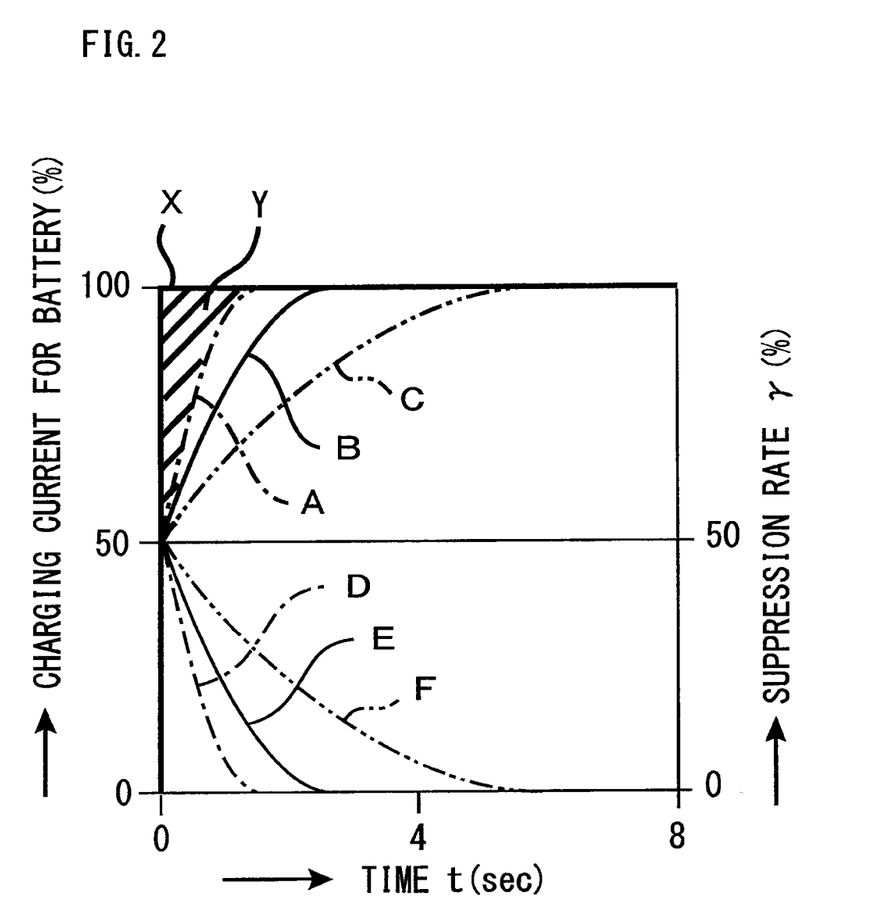
FIG. 2 is an explanation diagram for explaining the operation of the charging control apparatus for battery shown in FIG. 1.
Figure 3:
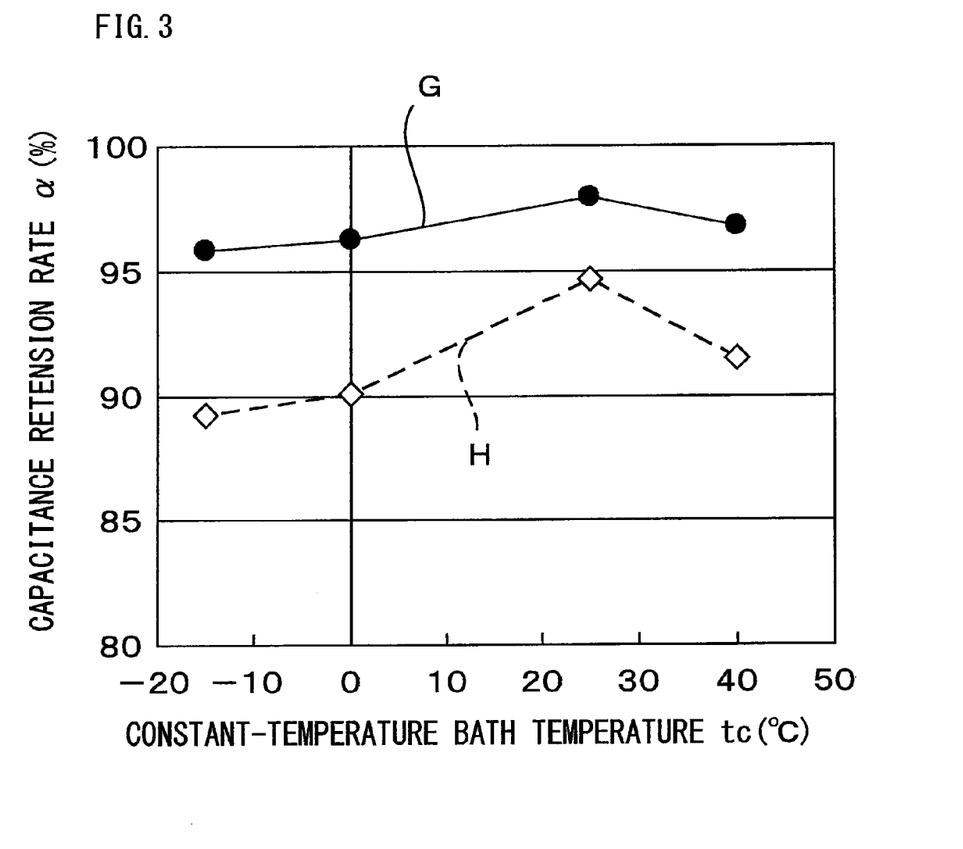
FIG. 3 is a characteristic diagram showing a result of examination relevant to the cycle life of a lithium-ion battery.

FIGS. 1 to 3 show embodiment 1 for carrying out the present invention. FIG. 1 is a circuit diagram showing the configuration of a charging control apparatus for battery. FIG. 2 is an explanation diagram for explaining the operation of the charging control apparatus for battery. FIG. 3 is a characteristic diagram showing a result of examination relevant to the cycle life of a lithium-ion battery. The present invention has been made based on the inventors' discovery that in the case of using a lithium-ion battery as the battery (secondary battery), by only suppressing initial charging current (described later in detail) for the lithium-ion battery, the cycle life of the lithium-ion battery is extended to be 1.5 times or longer even if the current is not limited so much after rising (after the suppression is ended). It is noted that according to a result of the examination by the inventors, upon discharging of the lithium-ion battery, even if the initial discharging current (current upon rising) is suppressed, an effect of extending the cycle life of the lithium-ion battery is not so remarkable.

Here, terms used in the present application will be defined as follows. A suppression rate $\gamma$ is calculated based on charging current J1 (hereinafter, simply referred to as current J1) for the battery in the case where the charging current for the battery is suppressed, with respect to charging current J2 (hereinafter, simply referred to as current J2) for the battery in the case where the charging current for the battery is not suppressed. It is noted that the lithium-ion battery is, generally, charged by constant current during the initial period of charging, and the current J2 is set at a value that does not cause large reduction in the cycle life in usage in which short-time charging is frequently repeated as described in the embodiment below, in accordance with the type of the battery, the pattern and the frequency of charging, and the like. A charging suppression time for battery refers to, when charging current for the battery is suppressed, a time until the suppression rate $\gamma$ decreases to be 0% as time elapses since the battery is connected to a power supply and the charging thereof is started. A charging start suppression rate $\gamma 0$ is calculated based on charging current J10 (hereinafter, simply referred to as current J10) at the start of charging immediately after the battery is connected to the power supply in the case where the charging current for the battery is suppressed, with respect to charging current J20 (hereinafter, simply referred to as current J20, which is almost equal to the current J2) at the start of charging in the case where the charging current for the battery is not suppressed.

Here, with reference to FIG. 3, a result of the examination relevant to the cycle life of the lithium-ion battery, obtained by the inventors, will be described. Under a load in "JC08 mode" which is one of travelling mode patterns for automobiles, change in the capacitance retention rate of the lithium-ion battery between the case of suppressing the initial charging current for the lithium-ion battery and the case of not performing such suppression was examined in a constant-temperature bath. In the case where, for a six-cell-series lithium-ion battery composed of six lithium-ion cells connected in series and each having a capacitance of 50 Ah, a three-cell-series capacitor composed of three electric double layer capacitor cells connected in series and each having a 0.1 $\Omega$F-class normalized internal resistance (product of internal resistance $\Omega$ and electrostatic capacitance F, $\Omega$F value) and a withstanding voltage of 2.7V at a temperature of 180 F is interposed in series only during the initial period of charging, the "JC08 mode" (20 minutes/cycle) is repeated 1000 times. The examination was conducted for four constant-temperature bath temperatures tc of $-15°$ C., $0°$ C., $25°$ C., and $40°$ C., and a result thereof is shown by a polygonal line G for which the horizontal axis indicates the constant-temperature bath temperature tc and the vertical axis indicates a capacitance retention rate $\alpha$ after 1000 times of repetition. In this case, the examination was conducted under the condition that the current J20 was set at twice (100 A, 2 C) the capacitance 50 Ah of the six-cell-series lithium-ion battery to be examined, the current J10 was set at about 50 A, and the charging start suppression rate $\gamma 0$ was set at about 50%, and that the suppression rate $\gamma$ exponentially decreased from the start of charging, and after about 2 to 6 seconds of the suppression time elapsed, the suppression rate $\gamma$ became almost 0% so that the charging current became the current J2 in a stationary state.

In addition, in the case where six-cell-series lithium-ion battery composed of six lithium-ion cells with the same capacitance connected in series is charged with constant current (current J2) from the very beginning not via the three-cell-series capacitors, a capacitance retention rate $\alpha$ after 1000 times of repetitions on the same temperature condition is shown by a polygonal line H. The capacitances of the six-cell-series lithium-ion batteries were measured through 100% charging and discharging in a rated voltage range, and the respective initial capacitances before the start of the examination were defined as 100%. Generally, in the case where a capacitance has become less than 80% or 70%, the life is determined to be at an end stage.

As a result of the examination, it was found that at any temperature, in the case (polygonal line G) where the three-cell-series capacitor was interposed in series only during the initial period of charging to suppress the initial charging current, the capacitance retention rate $\alpha$ was kept higher and the cycle life deterioration was greatly reduced. In addition, it was found that as compared to the case of $25°$ C., the deterioration (reduction of the capacitance retention rate $\alpha$) was large in the cases of $-15°$ C., $0°$ C., and $40°$ C. That is, on the lower-temperature side or the higher-temperature side than $25°$ C., particularly, in a harsh temperature region equal to or lower than $0°$ C. or equal to or higher than $40°$ C., the effect due to suppression of the initial charging current was large.

Therefore, it was found that deterioration due to charging is larger than deterioration due to discharging, and further, in such charging, the deterioration during the initial period of charging was larger. It is considered that this is because during the initial period of charging, diffusion resistance when a lithium ion passes through an SEI (Solid Electrolyte Interface) covering a graphite particle is large, and therefore, at rapid charging current, diffusion limitation occurs and the lithium ion precipitates as metal lithium in a gap between a negative electrode and a separator, and the like.

According to a generally recognized precipitation mechanism of metal lithium, a new SEI is formed in course of time around a slight amount of metal lithium precipitated in a gap between the negative electrode and the separator, and the like, whereby this location is stabilized, and therefore the next side reaction occurs at another location. When such precipitation of metal lithium has occurred, the number of lithium ions that can react decreases, resulting in reduction of the capacitance, that is, irreversible deterioration.

On the other hand, once the charging current starts to flow, the temperature increases and an ion conduction resistance reduces. Therefore, the charging current value that causes diffusion limitation in the SEI covering a graphite particle rapidly increases. That is, even if large charging current flows, deterioration due to side reaction is less likely to occur.

Conventionally, the upper limit value of charging current for a lithium-ion battery has been obtained based on known cycle life deterioration data using a simple rectangular wave. However, as a result of the inventors' examination, it was found that if the rectangular-wave charging current is suppressed only during the initial period of charging, that is, for several seconds (about 10 seconds at longest), a factor dominant for deterioration of the cycle life can be removed, and even if the upper limit of the charging current in the eventual stationary state is increased, the cycle life is not damaged so much. It is noted that it is proposed that the secondary battery is charged for, for example, about five hours while the charging current value for the secondary battery is continuously increased from the charging start voltage to the charging end voltage, thereby realizing life extension of the second battery (for example, see Japanese Laid-Open Patent Publication No. 2007-141493), though this technique is different from the case of charging the second battery from an electric generator regenerating kinetic energy as regenerative power as in the invention of the present application. However, this technique cannot be applied for the purpose of regenerating kinetic energy as regenerative power as in the present application, or does not need to be applied for such a purpose. This is because continuously performing for several hours regeneration of kinetic energy, particularly, regeneration of kinetic energy of a vehicle is not realistic, and in addition, extension of the cycle life is sufficiently realized if the suppression is performed about 10 seconds at longest only during the initial period of charging.

On the other hand, in the case of discharging, owing to a self-protection function in which the cell voltage reduces due to overvoltage when diffusion limitation occurs due to diffusion resistance, a risk of causing side reaction is small. As a factor of cell voltage reduction, voltage drop (iR loss) (resistance overvoltage) due to internal resistance and overvoltage (diffusion overvoltage) due to diffusion limitation are conceivable. However, in the case of charging, since power is forcibly applied, the energy cannot be transferred anywhere and the voltage increases, so that occurrence of side reaction is inevitable. The above is the mechanism found out from a result of the inventors' examination.

Such a behavior is not limited to the lithium-ion battery, but is considered to be common among secondary batteries including chemical reaction, e.g., a nickel hydride battery, a nickel-cadmium battery, a lead-acid battery, a sodium-sulfur battery, and the like.

Hereinafter, preferred embodiments of the charging control apparatus and the charging control method for secondary battery according to the present invention based on the above knowledge will be specifically described. FIG. 1 is a circuit diagram showing the configuration of a charging control apparatus for secondary battery according to embodiment 1 of the present invention. In FIG. 1, a bidirectional DC/DC converter 3 includes a switching device (S1) 31 as an upper arm switch, a switching device (S2) 32 as a lower arm switch, a reactor (L1) 33 as an output-side impedance device, and a smoothing capacitor (CDC) 34. A MOSFET is used for the switching device 31 and switching device 32. The DC/DC converter 3 is connected to a motor generator 7 via a primary-side bus 35 and a power converter 6. The power converter 6 converts DC power of a battery 1 described later into three-phase AC power, to drive the motor generator 7, or converts AC power generated by the motor generator 7 into DC power, to charge the battery 1. The motor generator 7 is provided in an automobile as a vehicle and is linked with an engine 8 of the automobile.

A current control apparatus 4 includes a capacitor (EDLC: electric double layer capacitor) 14 as a capacitor, a resistor (R1) 15, a resistor (R2) 16, a switch circuit (S4) 24, a switch circuit (S5) 25, and a switch circuit (S6) 26 as open-close devices, a program timer 4a as a timing device, a deterioration detector 4b for detecting the degree of deterioration of the battery (LIB: lithium-ion battery) 1 as a secondary battery, and a temperature detector 4c for detecting the temperature of the battery 1. It is noted that the capacitor 14, the resistor 15, and the resistor 16 correspond to a load impedance device of the present invention, and are connected in parallel to the battery 1.

The battery 1, the capacitor 14, and the resistors 15 and 16 which are connected in parallel are connected to both ends of the switching device 32 composing the DC/DC converter 3, via the reactor 33 as the output-side impedance device. It is noted that for the switch circuits 23, 24, 25, and 26, an open-close device with a contact point, such as a mechanical relay may be used, or a semiconductor switching device such as a MOSFET or an IGBT may be used in order to perform control at a higher speed with smaller switching loss. The deterioration detector 4b detects deterioration by detecting reduction in the battery capacitance and increase in the internal resistance by a known method (for example, see Japanese Laid-Open Patent Publication No. 8-293329 or Japanese Laid-Open Patent Publication No. 11-329512). The temperature detector 4c detects the temperature of, for example, a container or a module of the battery as a representative temperature of the battery, by using a thermocouple, a thermistor, or the like (not shown). It is noted that in the drawing, a measurement system for measuring current or voltage and filter elements (capacitor and reactor) for smoothing voltage are omitted for the purpose of simplification.

Next, the operation will be described. In the present embodiment, the charging start suppression rate γ0 is as shown below calculated based on J10 and J20.

Here,

J10 is current (peak value) at the moment when charging current is applied to the battery 1 with the switch circuits 23, 24, 25, and 26 being all closed, and J20 is current (peak value) at the moment when charging current is applied to the battery 1 with the switch circuit 23 being closed and the switch circuits 24, 25, and 26 being all opened.

In the present embodiment, the charging start suppression rate γ0 is set at 50%.

In FIG. 1, in the case where the motor generator 7 linked with wheels of the automobile via the engine 8 operates as an electric generator to retrieve the kinetic energy of the automobile as regenerative power, first, the program timer 4a closes all the switch circuits 23, 24, 25, and 26. It is noted that the DC/DC converter 3 steps down the voltage of the primary-side bus 35 and supplies the resultant voltage to a secondary-side bus 36 while the switching devices 31 and 32 are subjected to open-close control so that the voltage on the power supply side (switching device 32 side) of the reactor 33 becomes constant. Thus, regenerative power from the motor generator 7 is supplied to the battery 1 and also used for charging the capacitor 14 and power consumption in the resistor 15 and the resistor 16, whereby the charging current flowing into the battery 1 is suppressed. It is noted that the voltage drop value on the reactor 33 varies depending on the magnitude of impedance of the load impedance device connected via the reactor 33.

Next, while the switch circuit 23 for the battery 1 is kept being closed, the program timer 4a sequentially opens the switch circuits 25 and 26 with a certain time interval interposed therebetween, and then a certain time later, opens the switch circuit 24 for the capacitor 14, thereby decreasing the suppression rate γ of the charging current for the battery 1 as time elapses. Thus, the charging current for the battery 1 can be gradually increased. Then, the suppression rate γ eventually becomes 0%, so that the non-suppressed current J2 flows.

In the case of using a semiconductor switching device such as a MOSFET or an IGBT for the switch circuits 24 to 26, more detailed control can be performed. Through open-close control for the switch circuits 24 and 25 and the switch circuit 26, a time during which each of the capacitor 14 and the resistors 15 and 16 is connected in parallel to both ends of the switching device 32 is adjusted, thereby enabling detailed control and realizing a charging current characteristic in which the initial charging current smoothly increases from the current J1 to the current J2 with elapse of time t, as shown by a curve A of charging current in FIG. 2.

The curve A is a desirable charging current curve obtained in a normal state, in which the charging current reaches a stationary value in about 2 seconds. That is, the suppression rate γ exponentially decreases from 50% to become 0% in about 2 seconds, as shown by a curve D. It is noted that the normal state refers to a state with no deterioration of the battery 1 and not in a harsh temperature region in which the temperature of the battery 1 is equal to or lower than 0° C. or equal to or higher than 40° C. At this time, a current portion Y (hatched portion) at the upper left which is a differential part between a rectangular wave X which is the current J2 for the battery 1 and the curve A of the current J1, is absorbed as current flowing to the capacitor 14 and the resistors 15 and 16. It is noted that the energy absorbed in the capacitor 14 is to be discharged later.

In a deteriorated state in which deterioration of the battery 1 has progressed, as shown by a curve B (battery deteriorated state) in FIG. 2, the connection times of the capacitor 14, the resistor 15, and the resistor 16 are elongated to be longer than in the above normal state, that is, the speed of decreasing the suppression rate γ of the charging current is slowed down, whereby a ratio (hereinafter, simply referred to as a ratio) of power consumption in the resistors 15 and 16 and power consumption due to charging of the capacitor 14 with respect to generated power is increased. It is noted that a curve E indicates change in the suppression rate γ in this case, and the suppression rate exponentially decreases from 50% to become 0% in about 3 seconds. The charging suppression time is about 3 seconds.

Similarly, when the battery 1 is under a harsh temperature such as −10° C. or 50° C., as shown by a curve C (harsh temperature state) in FIG. 2, the connection times of the capacitor 14, the resistor 15, and the resistor 16 are more elongated than in the battery deteriorated state, to elongate the charging suppression time, that is, the speed of decreasing the suppression rate γ of the charging current is further slowed down, whereby the ratio of power consumption in the resistors 15 and 16 and power consumption due to charging of the capacitor 14 is further increased. It is noted that a curve F indicates change in the suppression rate γ in this case, and the suppression rate exponentially decreases from 50% to become 0% in about 6 seconds. The charging suppression time is about 6 seconds.

It is noted that the resistance values of the resistors 15 and 16 may be the same value, but if resistors having different resistance values are used, three patterns of resistance values, i.e., one of the resistors 15 and 16 or parallel connection thereof can be selected, thereby allowing a wide variety of impedance control. In addition, the charging current for the battery 1 is not limited to smooth change as shown by the curves A to C in FIG. 2, and as a matter of course, the charging current may be changed in a stepwise manner or the like, without losing the object of the present invention.

In the present embodiment, even under a harsh temperature, the charging current is controlled so as to reach a constant value (maximum value) in about 6 seconds as shown by the curve C in FIG. 2. Here, if temporal change in the increase of the initial charging current (suppressed charging current J1) for the battery 1 is more slowed down, an initial charging damage to the battery 1 is more decreased and the cycle deterioration is more suppressed. However, in the case where the power for charging is detoured such that the power is stored into the capacitor 14 once and then charges the battery 1, if temporal change in the initial charging current for the battery 1 is more slowed down, the capacitor 14 is required to have a larger capacitance. In the case where the resistors 15 and 16 are caused to consume the power to generate heat, if temporal change in the initial charging current for the battery 1 is more slowed down, the charging suppression time becomes longer and more power is wastefully consumed. Therefore, the determination of temporal change in the initial charging current for the battery is made based on the balance among the effect of extending the cycle life for the battery 1, the cost of the charging control apparatus for secondary battery, the power amount that can be retrieved, and the like.

Generally, batteries, not only a lithium-ion battery, gradually deteriorate due to cycle life and calendar life, whereby resistance against the initial charging damage to the battery is weakened. Therefore, it is desirable that in accordance with the degree of deterioration, charging control is performed such that, as the deterioration of the battery becomes larger, the ratio of power consumption in the resistor and power consumption due to charging of the capacitor upon charging of the battery is more increased to slow down the speed of decreasing the suppression rate γ of the charging current, thereby elongating the charging suppression time to more gradually increase the charging current for the battery.

Specifically, depending on the period during which the battery has been used, the charging suppression time may be elongated to gradually increase the degree of slowing down the temporal change in the initial charging current for the battery. Alternatively, the deterioration degree of the battery may be determined, and in accordance with the deterioration degree, the degree of slowing down the temporal change, that is, the charging suppression time may be controlled. That is, in accordance with the deterioration degree of the battery, the speed of decreasing the suppression rate γ of the charging current may be adjusted. If at the time when the battery is new, the speed of decreasing the suppression rate γ of the charging current is slowed down to the maximum extent, the charging suppression time is elongated and power loss due to consumption in the resistor increases. Therefore, due to increase in usage time and usage frequency of the capacitor, deterioration of the capacitor is caused to a greater or lesser extent. Therefore, it is desirable to adjust the speed of decreasing the suppression rate γ in accordance with the deterioration degree. It is noted that in any case, it is sufficient to elongate a time taken until the suppression rate becomes 0, to a degree not exceeding 10 seconds. The deterioration of the battery can be quantitatively detected by the deterioration detector 4b.

The inventors discovered that in the case where the operating temperature of the lithium-ion battery is in a harsh temperature region, that is, equal to or lower than 0° C. or equal to or higher than 40° C., the effect of the initial charging current suppression control of the present invention is significant. It is generally known that in the case where the battery is in a harsh temperature region, the cycle life of the lithium-ion battery significantly reduces, and the mechanism is theoretically considered as follows.

When the temperature of the battery is equal to or lower than 0° C., in the case of lithium-ion battery, the diffusion resistance of a lithium ion in the SEI covering a graphite particle becomes significantly large, and it becomes more difficult to accept the charging current. It is widely known that when the battery is rapidly charged at a temperature equal to or lower than 0° C., dendrite of lithium metal occurs to cause short-circuit between the negative electrode and the positive electrode, which can lead to fire accident. According to the present invention, suppression of the charging current at the start of charging and the speed of decreasing the suppression rate γ thereafter are controlled, that is, initial charging current suppression control is performed, whereby the lithium-ion battery is gradually heated and it becomes easy to accept the charging current. Therefore, it is obvious that the effect of extending the cycle life more increases.

In addition, at a temperature equal to or higher than 40° C., in the case of the lithium-ion battery, side reaction becomes likely to occur due to a high potential on the positive electrode, leading to significant reduction of the cycle life. Also in this case, by the initial charging current suppression control, rapid increase in the temperature is suppressed and transitional occurrence of a high potential is prevented, whereby side reaction becomes less likely to occur.

Therefore, at a temperature equal to or lower than 0° C. or equal to or higher than 40° C., i.e., in a harsh temperature region, it is desirable that upon charging of the battery, the ratio of power consumption in the resistor and power consumption due to charging of the capacitor is increased to strengthen the initial charging current suppression control so that the initial charging current for the battery is more gradually increased. That is, it is desirable that the charging suppression time is elongated to slow down the speed of decreasing the suppression rate γ.

By monitoring a representative temperature of the battery, using the case of 0° C. or lower or the case of 40° C. or higher as a trigger, the charging suppression time may be elongated and the ratio of power consumption in the resistor and power consumption due to charging of the capacitor may be greatly increased to strengthen the initial charging current suppression control. Alternatively, based on decrease or increase from a reference temperature, e.g., 25° C., the ratio of power consumption in the resistor and power consumption due to charging of the capacitor may be increased in proportion to the temperature difference, to strengthen the initial charging current suppression control. It is noted that the representative temperature of the battery is measured by the temperature detector 4c.

In embodiment 1, the case where the battery 1, the capacitor 14, the resistor 15, and the resistor 16 are connected in parallel and open-close control is performed for them, thereby adjusting the impedance to set the charging start suppression rate γ0 and changing the impedance to change the suppression rate γ, has been shown. Instead, parallel connection of the battery 1 and only the capacitor 14, parallel connection of the battery 1, the resistor 15, and the resistor 16, parallel connection of the battery 1 and only the resistor 15, or the like may be used, and by performing open-close control for them, the charging start suppression rate γ0 may be set and the suppression rate γ may be changed. Also in this case, the same effect of extending the cycle life of the battery is obtained.

As described above, according to the present embodiment, extension of the cycle life of the secondary battery is realized. In addition, even in the case where the capacitor 14 is fully charged, generated power can be absorbed by the resistors 15 and 16, whereby charging power for the battery can be reduced and deterioration of the battery can be suppressed.

Embodiment 2

Figure 4:
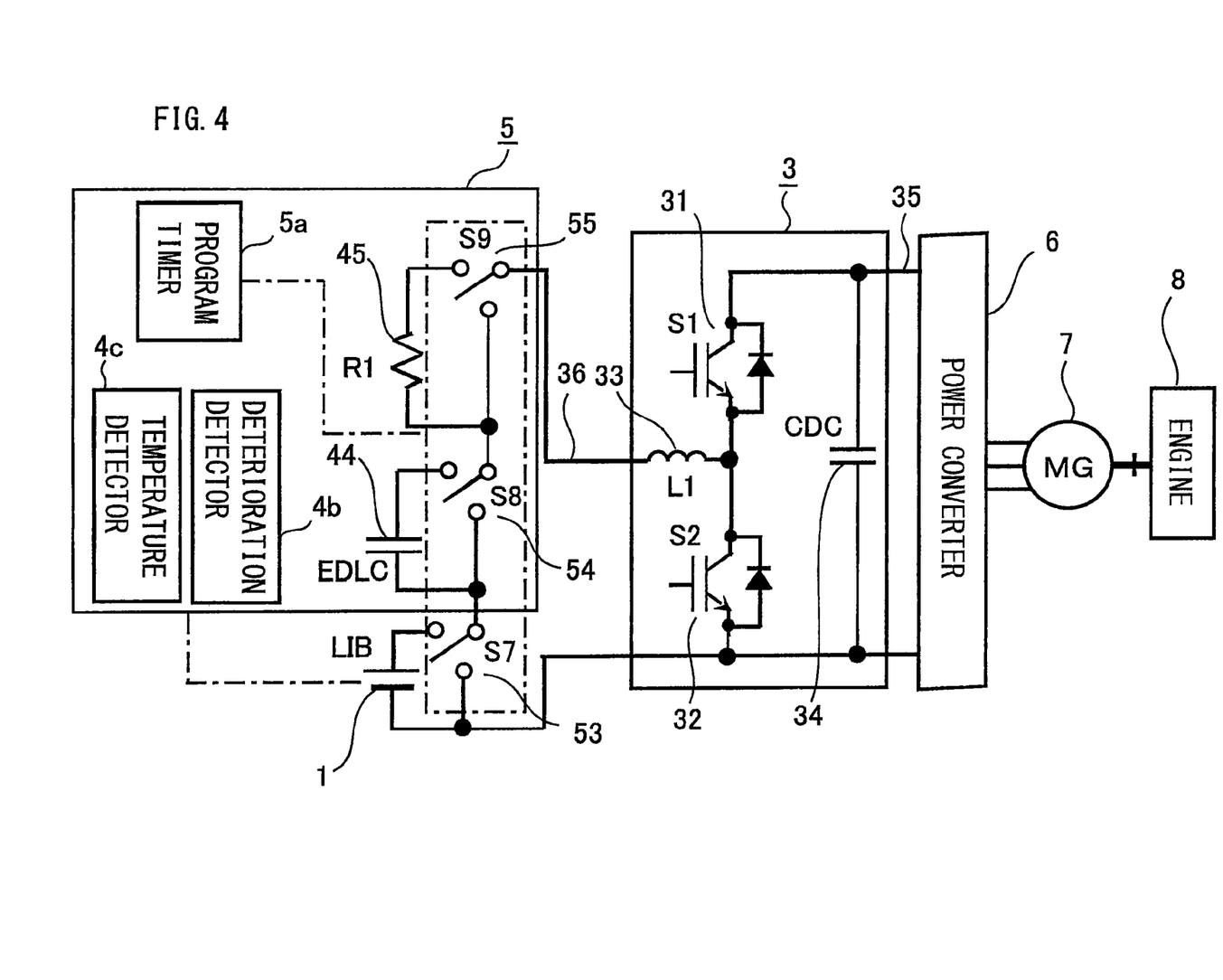
FIG. 4 is a circuit diagram showing the configuration of a charging control apparatus for battery according to embodiment 2.

FIG. 4 is a circuit diagram showing the configuration of a charging control apparatus for secondary battery according to embodiment 2 of the present invention. In FIG. 4, a current control apparatus 5 includes a capacitor (ELLC) 44 as a capacitor, a resistor (R3) 45, a double-throw switch circuit (S8) 54 and a double-throw switch circuit (S9) 55 as open-close devices, and a program timer 5a as a timing device. The battery 1, the capacitor 44, and the resistor 45 can be connected in series by the double-throw switch circuits 53, 54, and 55, and the battery 1, the capacitor 44, and the resistor 45 when connected in series are connected to both ends of the switching device 32 of the DC/DC converter 3 via the reactor 33. It is noted that for the switch circuits 53, 54, and 55, a relay circuit or the like may be used, or a semiconductor switching device such as a MOSFET or an IGBT may be used in order to perform control at a higher speed with smaller switching loss. The other components are the same as in embodiment 1 shown in FIG. 1. Therefore, such respective components are denoted by the same reference characters, and the description thereof is omitted. It is noted that the capacitor 44 and the resistor 45 correspond to a load impedance device of the present invention, and are connected in series to the battery 1.

At the start of charging for the battery 1, the program timer 5a closes all the switch circuits 53, 54, and 55 to the upper sides. Thus, the capacitor 44 and the resistor 45 are connected in series to the battery 1, whereby the battery 1 is connected to the DC/DC converter 3 via the capacitor 44 and the resistor 45. Owing to charging for the capacitor 44 and power consumption (voltage drop) in the resistor 45, voltage applied to the battery 1 is reduced, whereby the charging current flowing from the DC/DC converter 3 into the battery 1 is limited.

Next, after a predetermined time elapses since the battery 1 is connected, the program timer 5a switches the switch circuit 54 to the lower side while keeping the switch circuit 53 in a state closed to the upper side, so that the battery 1 and the resistor 45 are connected in series. Further, after a certain time elapses, the program timer 5a closes the switch circuit 55 to the lower side, so that the battery 1 is directly charged from the DC/DC converter 3. In this case, the suppression rate immediately after the battery 1 is connected, that is, the charging start suppression rate γ0 is set at 50% as in embodiment 1. In addition, the speed of decreasing the suppression rate γ is also set at almost the same value.

In the case of using a semiconductor switching device such as a MOSFET or an IGBT for the switch circuits 53, 54, and 55, more detailed control can be performed. Through switching between the switch circuits 53 and 54 and the switch circuit 54, a time during which each of the capacitor 44 and the resistor 45 is connected in series to the battery 1 is adjusted, and eventually, the battery 1 is connected to both ends of the switching device 32 via the reactor 33. Thus, the initial charging current for the battery 1 can be controlled similarly to embodiment 1.

In the case where the battery is deteriorated or at a harsh temperature, the connection time of the capacitor 44 and the resistor 45 is elongated to increase the ratio of power consumption in the resistor 45 and power consumption due to charging for the capacitor 44. Thus, the charging current suppression control time is elongated as shown in the curve B or the curve C in FIG. 2, whereby extension of the cycle life is realized.

In the present embodiment, the case where the battery 1, the capacitor 44, and the resistor 45 are connected in series, has been shown. Instead, series connection of the battery 1 and the capacitor 44 or series connection of the battery 1 and the resistor 45 may be used, whereby the same effect of extending the cycle life of the battery 1 is obtained. Further, embodiment 1 and embodiment 2 may be combined so that the series connection and the parallel connection of the capacitor and the resistor may be combined. In any case, the same effect of extending the cycle life of the battery is obtained.

In the above, in the case where the battery is charged from a power supply or an electric generator having a low internal impedance or a low line-path impedance without using the DC/DC converter 3, the capacitor 14 and the resistors 15 and 16 may be connected via an impedance device such as a resistor, instead of the reactor 33. Alternatively, an impedance device may not particularly be interposed, but the capacitor 44 and the resistor 45 may be interposed in series with the battery 1 as in embodiment 2.

It is noted that as in the above embodiments 1 and 2, in the case where the kinetic energy of a vehicle is retrieved from the motor generator 7 as a power supply via the DC/DC converter 3 to charge the battery 1, since the amount of the generated energy is not so large, if control is performed with the capacitor 14 and the resistors 15 and 16 being connected via the reactor 33 as an impedance device as in the present embodiment, voltage drop due to the reactor 33 effectively works for suppression of the initial charging current including the current J10 for the battery 1.

Embodiment 3

Figure 5:
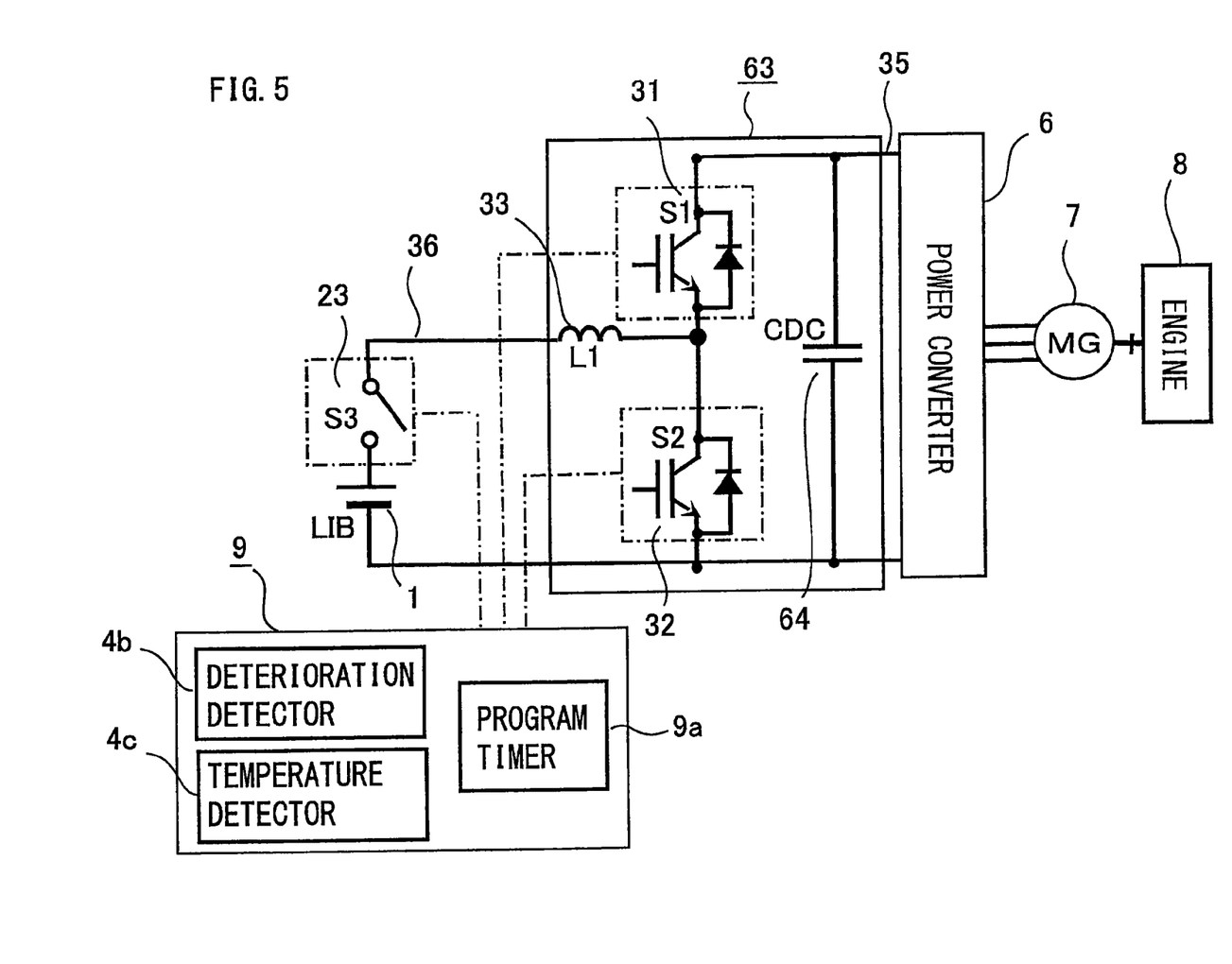
FIG. 5 is a circuit diagram showing the configuration of a charging control apparatus for battery according to embodiment 3.
Figure 6:
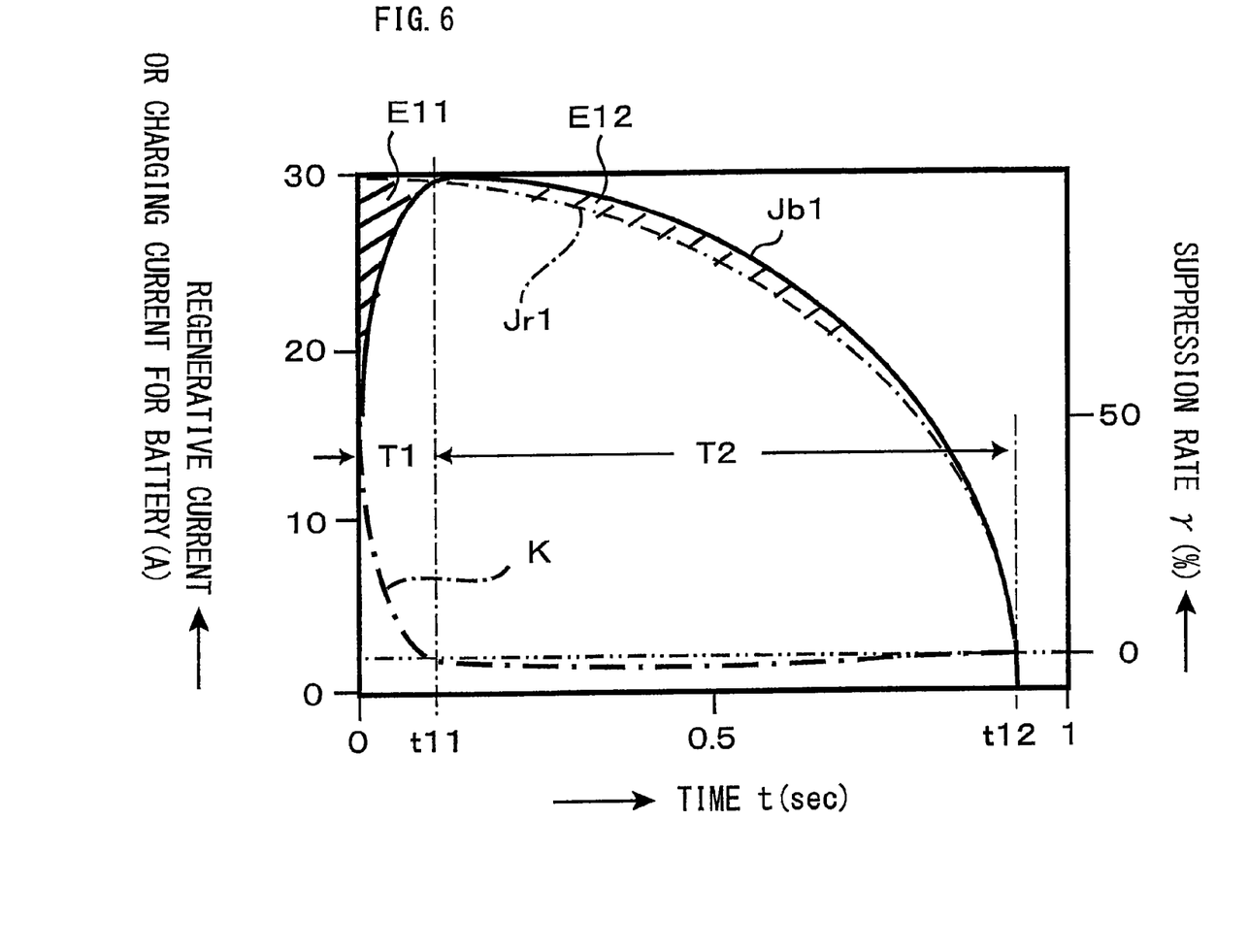
FIG. 6 is an explanation diagram for explaining the operation of the charging control apparatus for battery shown in FIG. 5.

FIGS. 5 and 6 show embodiment 3 of the present invention. FIG. 5 is a circuit diagram showing the configuration of a charging control apparatus for secondary battery. FIG. 6 is an explanation diagram for explaining the operation of the charging control apparatus for battery. In the circuit diagram in FIG. 5, a DC/DC converter 63 includes an input-side capacitor 64 which also serves as a smoothing capacitor. The input-side capacitor 64 has a considerably larger capacitance and a considerably higher withstanding voltage than those of the smoothing capacitor 34 shown in FIG. 1. A series circuit composed of the switch circuit 23 and the battery 1 is connected to the DC/DC converter 63 via the secondary-side bus 36. In addition, a current control apparatus 9 includes a program timer 9a. The program timer 9a controls the switching device 31 and the switching device 32, and the switch circuit 23. The other components are the same as in embodiment 1 shown in FIG. 1. Therefore, such respective components are denoted by the same reference characters, and the description thereof is omitted.

When regenerative power is generated, the program timer 9a performs switching control for the switching device 31 and the switching device 32 of the DC/DC converter 63, to step down the voltage of the primary-side bus 35 and supply the regenerative power to the secondary-side bus 36, thereby storing the regenerative power into the battery 1. For storing the regenerative power into the battery 1, the voltage of the secondary-side bus 36 which is supply voltage for the battery 1 is adjusted through switching control for the switching device 31 and the switching device 32 such that charging current Jb1 for the battery varies as shown in FIG. 6. Also in the present embodiment, as shown by a curve K in FIG. 6, the charging start suppression rate γ0 is set at 50% (current 15 A), and the switching device 31 and the switching device 32 of the DC/DC converter 63 are subjected to open-close control such that the suppression rate γ becomes 0 at a predetermined time t11, whereby the charging current for the battery 1 is suppressed. At this time, extra regenerative power exceeding power to be supplied to the battery 1 is stored into the input-side capacitor 64 once by the voltage of the DC/DC converter 63 on the primary-side bus 35 side being increased. It is noted that in FIG. 6, the vertical axis at the left indicates the magnitude of regenerative current Jr1 or charging current Jb1 for the battery, and the vertical axis at the right indicates the suppression rate γ.

More specific description will be shown below. FIG. 6 shows changes in the regenerative current Jr1 generated in the motor generator 7 and the charging current Jb1 for the battery 1. During about 0.1 second (t11) after regenerative power is generated, the program timer 9a performs open-close control for the switching devices 31 and 32, thereby limiting the regenerative power supplied to the secondary-side bus 36. During this interval T1, the battery charging current Jb1 is controlled to be suppressed charging current. Regenerative power E that has not been stored into the battery 1 during the interval T1 is represented by the following expression and is stored into the input-side capacitor 64.

$$E=(½)\times(C\times V)\times(C\times V)$$

Here, E is energy stored into the input-side capacitor 64, C is an electrostatic capacitance of the input-side capacitor 64, and V is voltage of the input-side capacitor 64.

As a result, the voltage V of the input-side capacitor 64, that is, the voltage of the primary-side bus 35 rapidly increases from 14V to 200V, for example. On the other hand, the voltage of the secondary-side bus 36 gradually increases. In FIG. 6, the time t11 is a time when the regenerative current Jr1 coincides with the charging current Jb1 for the battery 1, and this is determined by current meters for the primary-side bus 35 and the secondary-side bus 36, which are not shown in FIG. 5. After the time t11, the regenerative power stored in the input-side capacitor 64 is supplied to the secondary-side bus 36 side to charge the battery 1. Specifically, the voltage of the primary-side bus 35 which has been rapidly increased is stepped down and supplied to the secondary-side bus 36. At this time, the regeneration power is still being generated, and therefore the charging current Jb1 for the battery flows as current obtained by adding current supplied from the input-side capacitor 64 to the regenerative current Jr1 (equal to non-suppressed charging current J2), to gradually charge the battery 1. As a result, the regenerative power stored in the input-side capacitor 64 in an area E11 (interval T1) in FIG. 6 is supplied and stored into the battery 1 in an area E12 (interval T2).

Thus, the charging current Jb1 for the battery 1 is controlled so as to change in accordance with a predetermined charging characteristic, that is, so that the charging current at the start of charging is limited and the charging current will not rapidly increase, whereby an effect of extending the cycle life is obtained. It is noted that after the time t11, the charging current Jb1 for the battery is larger than the regenerative current Jr1 being generated, and therefore the suppression rate is calculated as minus. However, the charging current Jb1 for the battery is controlled so as not to exceed a predetermined value, and the charging current Jb1 decreases from the predetermined value as time elapses. Therefore, the cycle life is not influenced.

Similarly to embodiment 1, by using the deterioration detector 4b and the temperature detector 4c, if the battery 1 is more deteriorated or if the battery 1 is at a high temperature or near 0° C., the initial charging current suppression control period (interval T1) is more elongated. Thus, a greater effect of extending of the cycle life is obtained.

It is noted that electric energy stored in the area E21 greatly depends on the electrostatic capacitance C and the voltage V of the input-side capacitor 64, and it is desirable to select the input-side capacitor 64 having a large electrostatic capacitance and a high withstanding voltage. It is desirable to use an aluminum electrolytic capacitor having a high withstanding voltage (for example, 500V) and a large capacitance. Instead, a plurality of electric double layer capacitors (EDLC) connected in series may be used. Although the withstanding voltage of the electric double layer capacitor is small, some electric double layer capacitors have large capacitances of 10 to 1000 F, and therefore the electric double layer capacitors can store large energy by being connected in series. However, since an instantaneous property is required, it is desirable to use an electric double layer capacitor having a normalized internal resistance (ΩF value) of 0.5 ΩF or smaller as an indicator of an instantaneous property of a capacitor.

As described above, according to the present embodiment, regenerative power is temporarily stored into the input-side capacitor 64 and then charges the battery 1, whereby energy can be retrieved more effectively.

Embodiment 4

Figure 7:
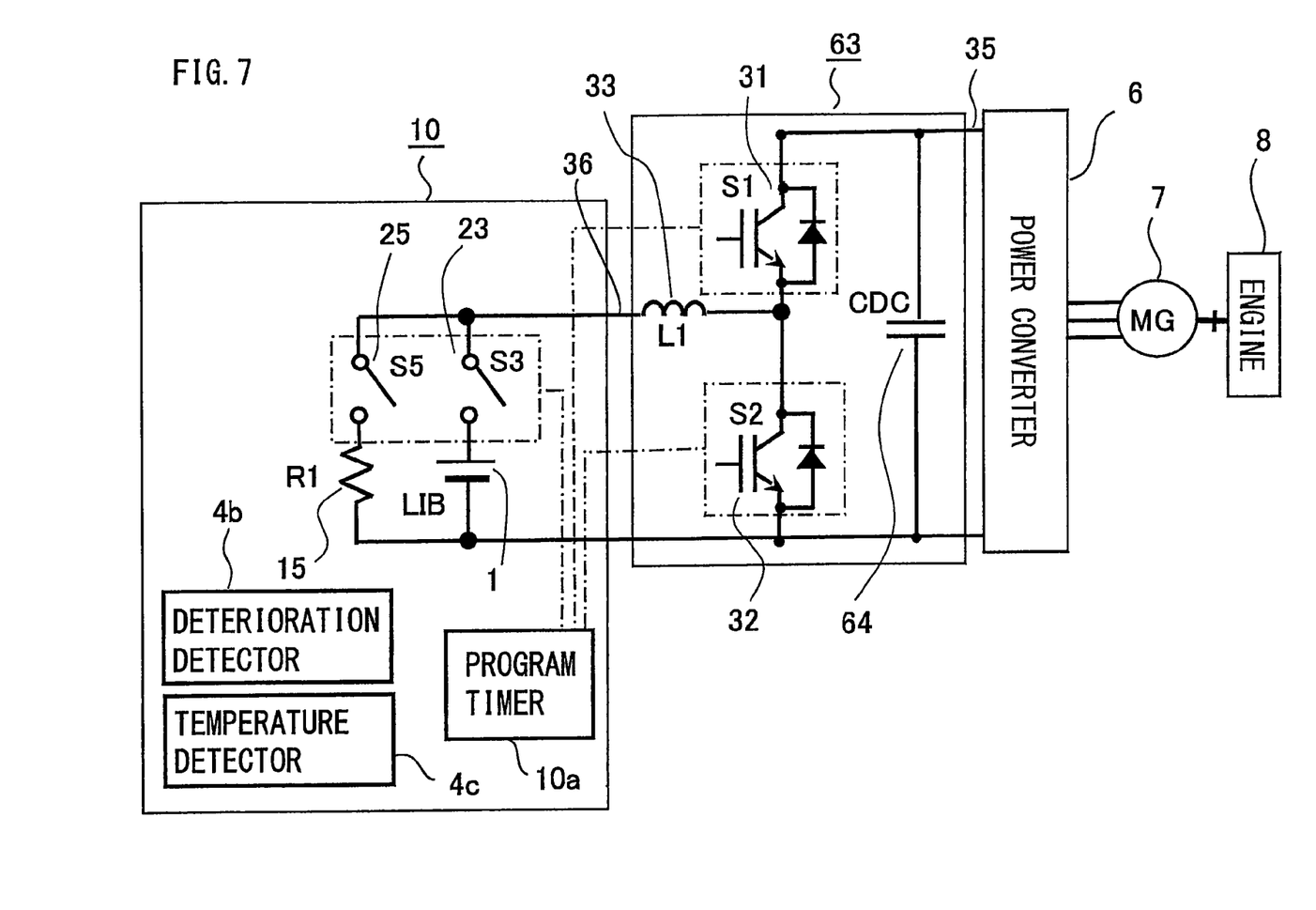
FIG. 7 is a circuit diagram showing the configuration of a charging control apparatus for battery according to embodiment 4.
Figure 8:
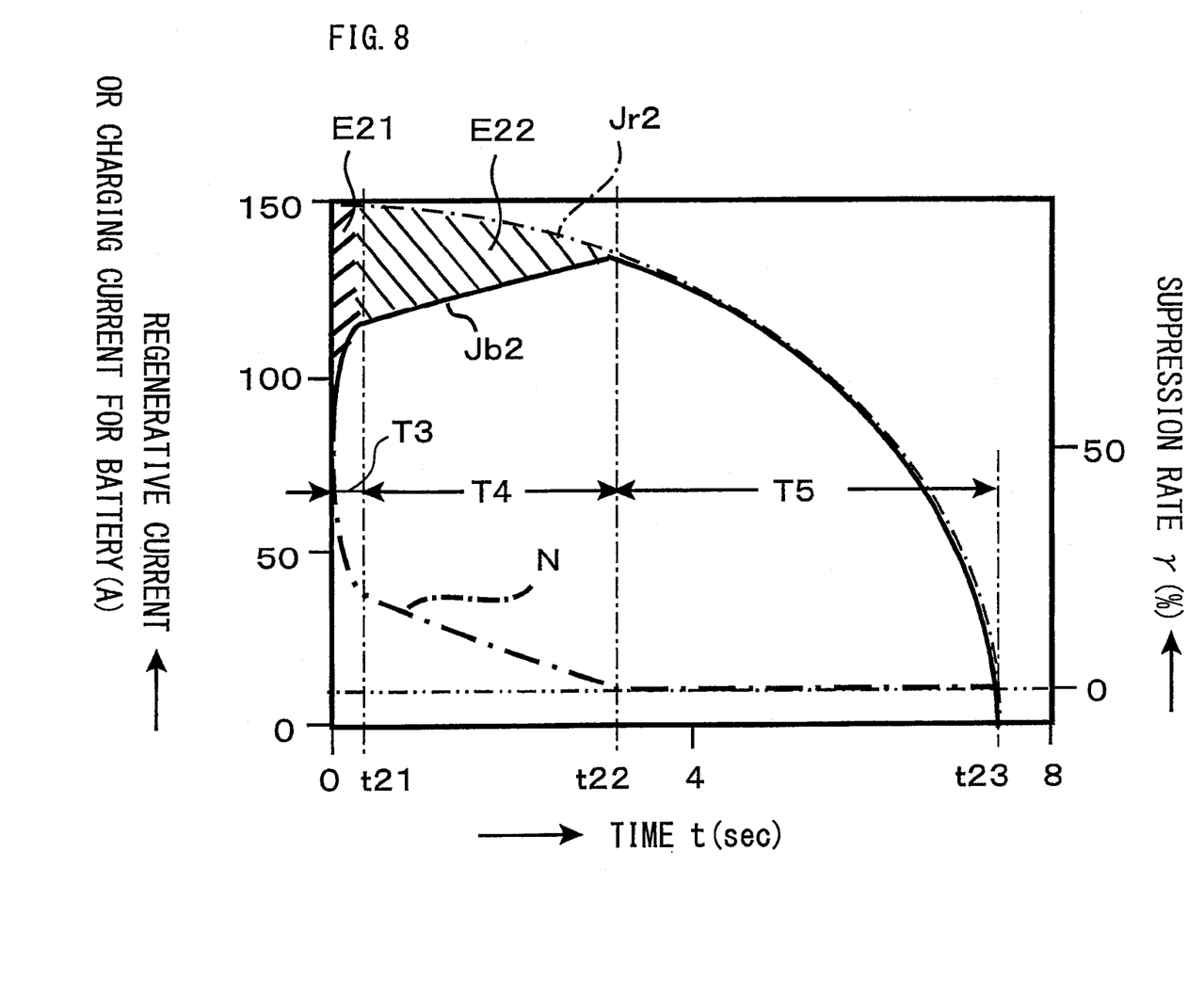
FIG. 8 is an explanation diagram for explaining the operation of the charging control apparatus for battery shown in FIG. 7.

FIGS. 7 and 8 show embodiment 4 of the present invention. FIG. 7 is a circuit diagram showing the configuration of a charging control apparatus for secondary battery. FIG. 8 is an explanation diagram for explaining the operation of the charging control apparatus for battery. In the circuit diagram in FIG. 7, the resistor 15 is connected in parallel to the battery 1 via the switch circuit 25 as an open-close device. In addition, a current control apparatus 10 includes a program timer 10a. The other components are the same as in embodiment 3 shown in FIG. 5. Therefore, such respective components are denoted by the same reference characters, and the description thereof is omitted.

FIG. 8 shows changes in regenerative current Jr2 generated in the motor generator 7 and charging current Jb2 for the battery 1. By the program timer 10a, in FIG. 8, during a period (interval T3) until a time t21 (for example, about 0.1 second) after regenerative power is generated, extra part of the generated regenerative power that has not been consumed in the resistor 15 and has not been stored into the battery 1 is stored into the input-side capacitor 64 by the voltage of the input-side capacitor 64 being increased as in embodiment 3. Until the time t21, the switch circuit 23 and the switch circuit 25 are in a closed state, and the regenerative power is consumed (heat generation) in the resistor 15 and consumed for charging the battery 1 while extra regenerative power is stored into the input-side capacitor 64 as described above.

During a period (interval T4) from the time t21 until a time t22 when the regenerative current Jr2 coincides with the charging current Jb2 for the battery 1, the switch circuit 25 repeats open-close operation to control supply current to the resistor 15 while the ratio (duty cycle) of closed time of the switch circuit 25 is gradually decreased to increase the charging current Jb2 for the battery 1. Then, at the time t22 when the regenerative current Jr2 coincides with the charging current Jb2 for the battery 1, the switch circuit 25 is opened. It is noted that in FIG. 8, the charging current Jb2 for the battery is drawn as linearly increasing in the interval T4, but actually, the charging current Jb2 has pulsation due to switching. However, although not shown, if a filter circuit (reactor and capacitor) is added, the magnitude of the pulsation can be reduced. On the other hand, the switch circuit 23 on the battery 1 side may be constantly in a closed state until a time t23 when the regenerative power becomes 0, as long as the voltage of the secondary-side bus 36 is higher than the voltage of the battery 1.

In FIG. 8, in an area E21 (interval T3), regenerative power is stored into the input-side capacitor 64, and in an area E22 (interval T4), in addition to regenerative power being generated, the regenerative power stored in the input-side capacitor 64 is supplied to the secondary-side bus 36 side, to be used for power consumption in the resistor 15 and charging of the battery 1.

Thus, as shown by a curve N, the suppression rate γ is set at 50% (75 A) of the current J2 (150 A) at the start of charging for the battery 1, and decreases as time elapses, to become 0 at the time t22. That is, during the initial period of charging, the charging current is controlled so as not to rapidly increase and so as not to exceed a predetermined value (in the present embodiment, current J2 (150 A)), whereby an effect of extending the cycle life is obtained. In the case where larger generative power is expected as compared to the case of embodiment 3, it is economical to add the resistor 15 to raise the suppression rate γ as in embodiment 4, thereby avoiding increase in the capacitance of the input-side capacitor 64.

Similarly to embodiment 1, by using the deterioration detector 4b and the temperature detector 4c, if the battery 1 is more deteriorated or if the battery 1 is at a high temperature or near 0° C., the initial charging current suppression control time (intervals T3+T4) is more elongated. Thus, a greater effect of extending of the cycle life is obtained.

In embodiment 4, the case where one resistor is connected in parallel to the battery 1 has been shown. Instead, as in embodiment 1 and embodiment 2, a plurality of resistors may be connected in parallel, in series, or in parallel and series. In this case, through open-close control for switching devices respectively connected to the plurality of resistors, control of the suppression rate γ can be performed in a more detailed manner and during a longer time than in embodiment 4. Thus, the effect of extending the cycle life can be further enhanced.

It is noted that as in embodiment 3, electric energy stored in the area E21 greatly depends on the electrostatic capacitance C and the voltage V of the input-side capacitor 64, and it is desirable to select the input-side capacitor 64 having a large electrostatic capacitance and a high withstanding voltage. An electric double layer capacitor (EDLC) is suitable as such a capacitor, or a large-sized aluminum electrolytic capacitor may be used.

Particularly, in the case where the kinetic energy of a vehicle is retrieved from the motor generator 7 as a power supply via the DC/DC converter 3 to charge the battery 1, the generated energy has a high peak value, occurs within a short time, and is retrieved frequently. Therefore, as in embodiments 3 and 4 described above, if the power is temporarily stored into the input-side capacitor 64 and retrieved later, more energy can be saved. As a matter of course, the DC/DC converter is not limited to a step-down type, but may be a step-up type. Also in this case, the same effect is provided.

In the above, the case where the kinetic energy of a vehicle is retrieved as power by using the motor generator 7 provided in the vehicle, has been shown. However, the present invention is not limited thereto. Even in the case where the battery is charged from another type of electric generator, the same effect is provided.

In the above embodiments, the case where the battery is a lithium-ion battery has been shown. However, instead of a lithium-ion battery, even in the cases of using a wide variety of batteries including chemical reaction, e.g., a nickel hydride battery, a nickel-cadmium battery, a lead-acid battery, a sodium-sulfur battery, and the like, the same effect is provided. Particularly, application to a lead-acid battery which has a short cycle life is effective. It is noted that the charging start suppression rate $\gamma 0$ and the speed of decreasing the suppression rate $\gamma$ are determined so as not to inhibit chemical reaction of the battery and cause great reduction of the cycle life, in accordance with the type, the deterioration degree, and the temperature of the battery. For example, in the case of lithium-ion battery, as shown in the above examination result, it is effective that the charging start suppression rate $\gamma 0$ is set at 50% and the speed of decreasing the suppression rate $\gamma$ is set such that the suppression rate $\gamma$ becomes 0% in about 6 seconds, that is, the charging suppression time is set at about 6 seconds. As a matter of course, the decrease speed of the suppression rate $\gamma$ may be slower than the above, but suppression within a period not exceeding 10 seconds is sufficient. That is, suppression may be performed within a period not exceeding 10 seconds determined based on the balance among the effect of extending the cycle life of the battery 1, the cost of the charging control apparatus for secondary battery, the energy amount that can be retrieved, and the like.

It is noted that, within the scope of the present invention, the above embodiments may be freely combined with each other, or each of the above embodiments may be modified or abbreviated as appropriate.

The invention claimed is:

1. A charging control apparatus, comprising:
    at least one of a load impedance device connected in parallel to a secondary battery and a load impedance device connected in series to the secondary battery;
    the load impedance device being connected to an electric generator regenerating kinetic energy as regenerative energy to provide a charging current to charge the secondary battery;
    a current control apparatus configured to perform control of load impedance of the load impedance device so as to suppress the charging current for the secondary battery at the start of the charging of the secondary battery with respect to the charging current at the start of charging when the charging current is not suppressed, and to increase the charging current as time elapses.

2. The charging control apparatus according to claim 1, further comprising a DC/DC converter connected between the secondary battery and the electric generator, so that the secondary battery is charged from the electric generator via the DC/DC converter.

3. The charging control apparatus according to claim 2, wherein
    the load impedance device includes at least one of a capacitor and a resistor, and an open-close device, and
    the current control apparatus performs open-close control for the open-close device, thereby controlling the impedance of the load impedance device.

4. The charging control apparatus according to claim 3, wherein
    the current control apparatus includes a timing device, measures an elapsed time from the start of charging by the timing device, and performs open-close control for the open-close device in accordance with the elapsed time, thereby controlling the impedance of the load impedance device.

5. A charging control apparatus according to claim 1, comprising:
    a DC/DC converter including an input-side capacitor connected to the secondary battery and charged by a charging current from the electric generator via the DC/DC converter; wherein
    the current control apparatus controls output voltage of the DC/DC converter to suppress the charging current at the start of charging and to increase the charging current as time elapses, and stores a part of the regenerative power into the input-side capacitor during a period in which the charging current is being suppressed.

6. The charging control apparatus according to claim 5, wherein
    the current control apparatus controls the DC/DC converter, thereby charging, via the DC/DC converter, the secondary battery with the regenerative power stored in the input-side capacitor.

7. The charging control apparatus according to claim 6, wherein
    the current control apparatus includes a resistor and an open-close device connected in series to the resistor, the resistor being connected in parallel to the secondary battery via the open-close device, and
    the current control apparatus performs control so as to close the open-close device at the start of charging for the secondary battery, thereby connecting the resistor in parallel to the secondary battery, and as time elapses, decrease a time of current application to the resistor through open-close control for the open-close device, thereby increasing the charging current.

8. The charging control apparatus according to claim 1, wherein
    the current control apparatus includes a deterioration detector configured to detect deterioration of the secondary battery, and to adjust a speed of increasing the charging current in accordance with the detected degree of the deterioration.

9. The charging control apparatus according to claim 1, wherein
   the current control apparatus includes a temperature detector configured to detect a temperature of the secondary battery, and to adjust a speed of increasing the charging current in accordance with the detected temperature.

* * * * *